(12) United States Patent
Tsai

(10) Patent No.: US 10,792,843 B2
(45) Date of Patent: Oct. 6, 2020

(54) METHOD OF MANUFACTURING A CARBON FIBER WHEEL RIM

(71) Applicant: MARSHAL INDUSTRIAL CORP., Tortola (VG)

(72) Inventor: Ming-Jen Tsai, Miaoli County (TW)

(73) Assignee: MARSHAL INDUSTRIAL CORP., Tortola (VG)

( * ) Notice: Subject to any disclaimer, the term of this patent is extended or adjusted under 35 U.S.C. 154(b) by 218 days.

(21) Appl. No.: 16/110,400

(22) Filed: Aug. 23, 2018

(65) Prior Publication Data
US 2020/0061872 A1 Feb. 27, 2020

(51) Int. Cl.
*B29C 33/44* (2006.01)
*B29C 70/54* (2006.01)
*B29C 70/48* (2006.01)
*B29K 307/04* (2006.01)
*B29L 31/32* (2006.01)

(52) U.S. Cl.
CPC ............ *B29C 33/448* (2013.01); *B29C 70/48* (2013.01); *B29C 70/54* (2013.01); *B29K 2307/04* (2013.01); *B29K 2995/0062* (2013.01); *B29L 2031/32* (2013.01)

(58) Field of Classification Search
CPC ....... B29C 33/448; B29C 70/54; B29C 70/48; B29C 70/36; B29C 70/443; B29C 70/32; B29K 2995/0062; B29K 2307/04; B29L 2031/32; B29L 2031/3091; B29L 2023/245; B60B 2310/242; B60B 2360/3416; B60B 5/02; B60B 21/062
See application file for complete search history.

(56) References Cited

U.S. PATENT DOCUMENTS

| | | | | |
|---|---|---|---|---|
| 5,899,118 A * | 5/1999 | Satoh | ....................... | B62D 1/04 74/552 |
| 5,985,072 A * | 11/1999 | Finck | ..................... | B29C 63/18 156/184 |
| 6,726,292 B1* | 4/2004 | Schroeder | ................. | B60B 5/02 301/104 |
| 2014/0227467 A1* | 8/2014 | Fraidenburgh | .......... | B29C 70/30 428/36.1 |
| 2014/0342144 A1* | 11/2014 | Nakayama | ................. | C08J 5/06 428/220 |

* cited by examiner

*Primary Examiner* — Nahida Sultana
(74) *Attorney, Agent, or Firm* — Muncy, Geissler, Olds & Lowe, P.C.

(57) ABSTRACT

A method of manufacturing a carbon fiber wheel rim is provided, including flowing steps of: preparing a core ring, including a core material which is disintegrable and annular; continuously obliquely winding at least one first dry carbon yarn around the core ring, to form a first semifinished rim; placing the first semifinished rim in a mold, and performing vacuuming, resin injection and thermoforming, to form a second semifinished rim; removing the second semifinished rim out of the mold, and disintegrating and removing the core material.

10 Claims, 6 Drawing Sheets

METHOD OF MANUFACTURING A CARBON FIBER WHEEL RIM

BACKGROUND OF THE INVENTION

Field of the Invention

The present invention relates to a method of manufacturing a carbon fiber wheel rim.

Description of the Prior Art

A conventional method of manufacturing a carbon fiber rim includes following steps: pre-immersing carbon fiber sheets in resin, pasting the carbon fiber sheets with the resin on an annular core (such as a bladder) into several layers, and placing the processed annular core in a mold and molding by thermoforming.

However, the conventional method has many disadvantages. For example, the conventional method requires more resin to pre-immerse the carbon fiber sheets; the pre-immersed carbon fiber sheets need to be pasted by manpower, which is time-consuming and labor-intensive; directions of carbon fibers of the carbon fiber sheets are inconsistent and discontinuous, and transmission of stress may be discontinuous when the carbon fiber sheets are overlapped with each other so that structural integrity and structural strength of the wheel rim are poor; each of the overlaps of the carbon fiber sheets has large, many and uneven gaps which may result in more large bubbles after the thermoforming and low yield.

The present invention is, therefore, arisen to obviate or at least mitigate the above-mentioned disadvantages.

SUMMARY OF THE INVENTION

The main object of the present invention is to provide a method of manufacturing a carbon fiber wheel rim which is simple, more efficient and with high yield, and the wheel rim made by the method has preferable structural strength.

To achieve the above and other objects, the present invention provides a method of manufacturing a carbon fiber wheel rim, including following steps of: preparing a core ring, including a core material which is disintegrable and annular; continuously obliquely winding at least one first dry carbon yarn around the core ring, to form a first semifinished rim; placing the first semifinished rim in a mold, and performing vacuuming, resin injection and thermoforming, to form a second semifinished rim; removing the second semifinished rim out of the mold, and disintegrating and removing the core material.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
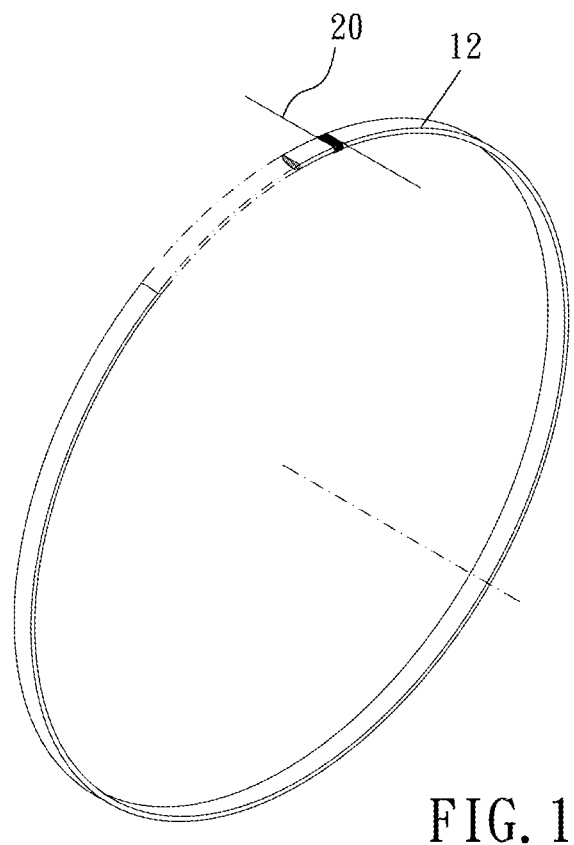
FIGS. 1 and 2 are schematic diagrams of manufacturing an upper semifinished rim of a preferable embodiment of the present invention.
Figure 2:
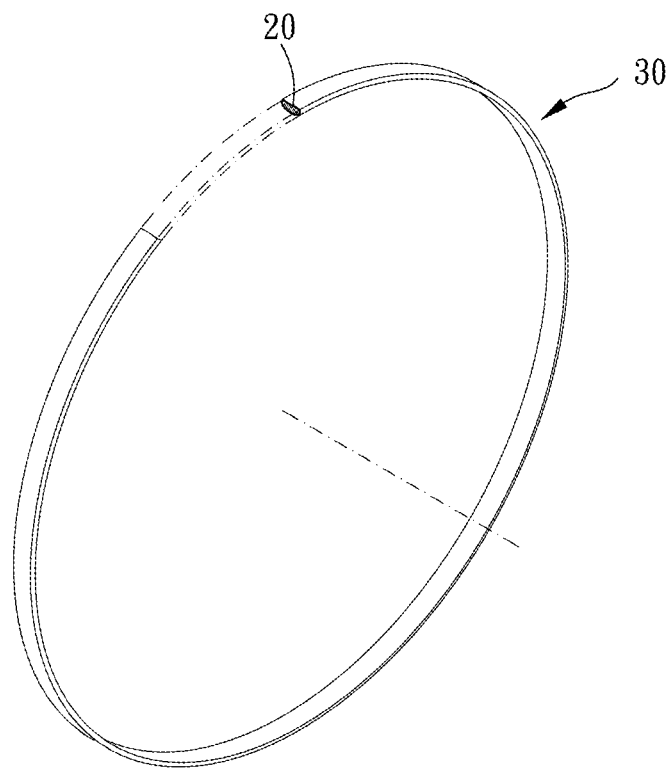
Figure 3:
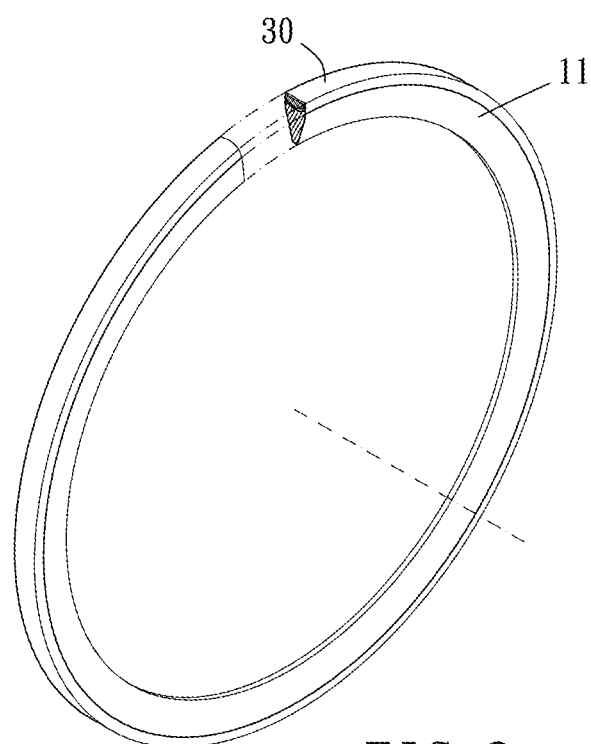
FIGS. 3 and 4 are schematic diagrams of manufacturing a core ring of a preferable embodiment of the present invention.
Figure 4:
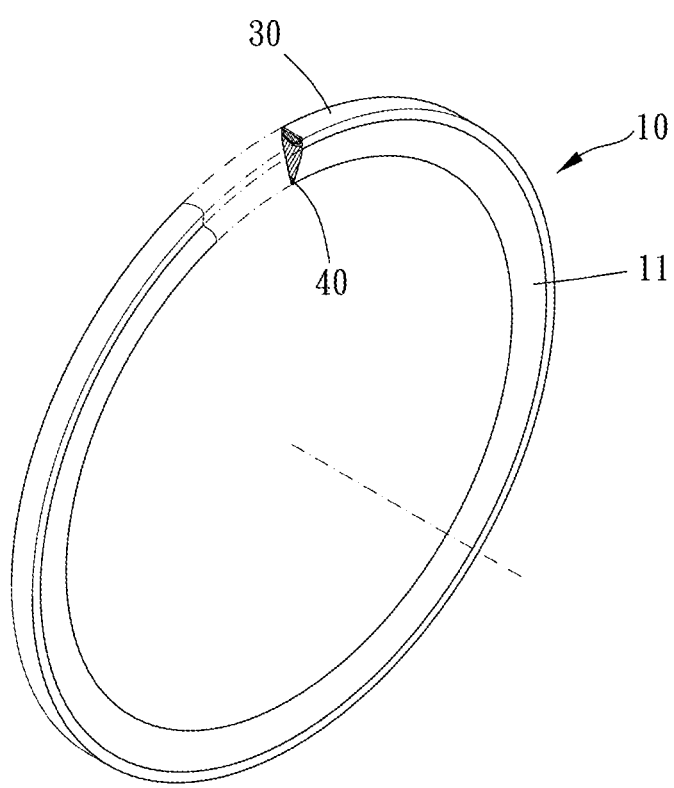
Figure 5:
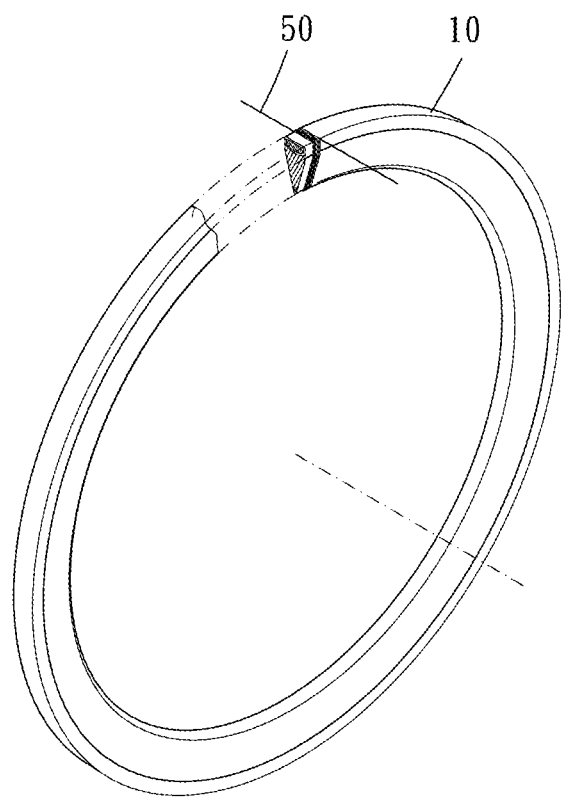
FIGS. 5 and 6 are schematic diagrams of manufacturing a first semifinished rim of a preferable embodiment of the present invention.
Figure 6:
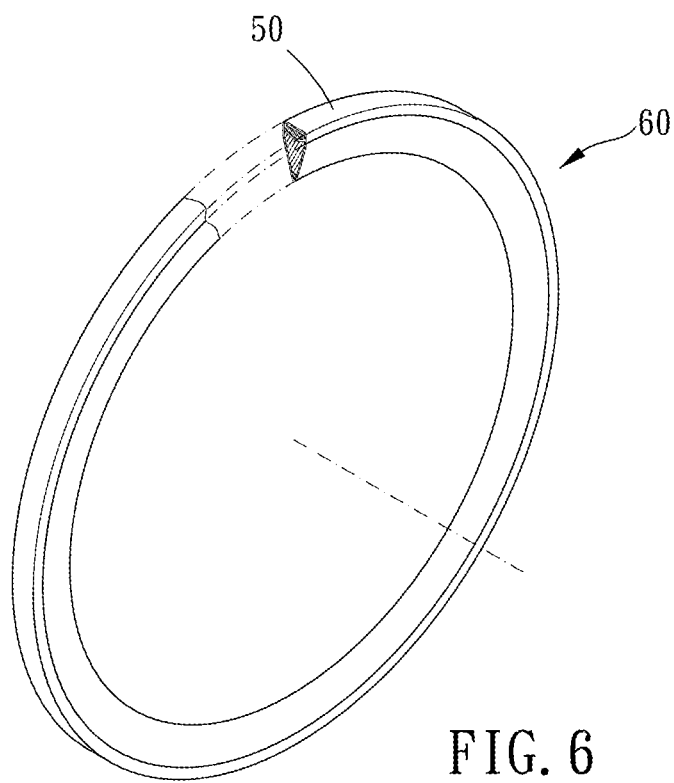
Figure 7:
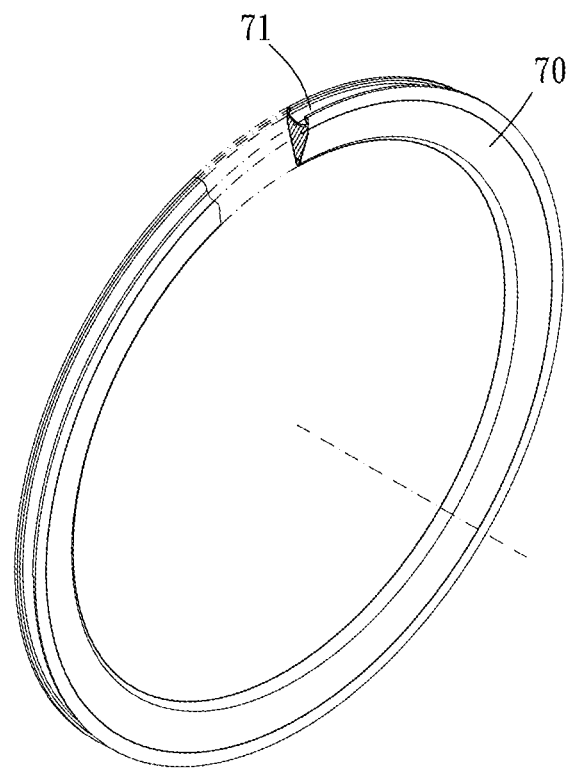
FIG. 7 is a schematic diagram of a second semifinished rim with an annular groove of a preferable embodiment of the present invention.
Figure 8:
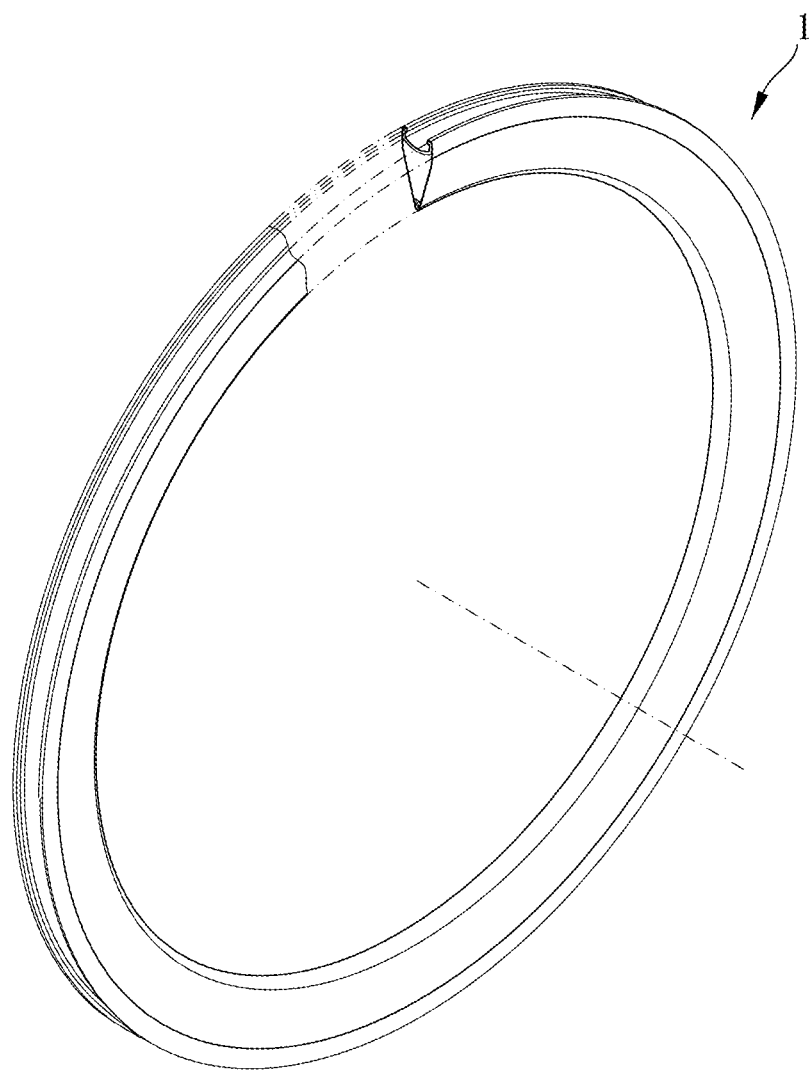
FIG. 8 is a stereogram of a carbon fiber rim of a preferable embodiment of the present invention.
Figure 9:
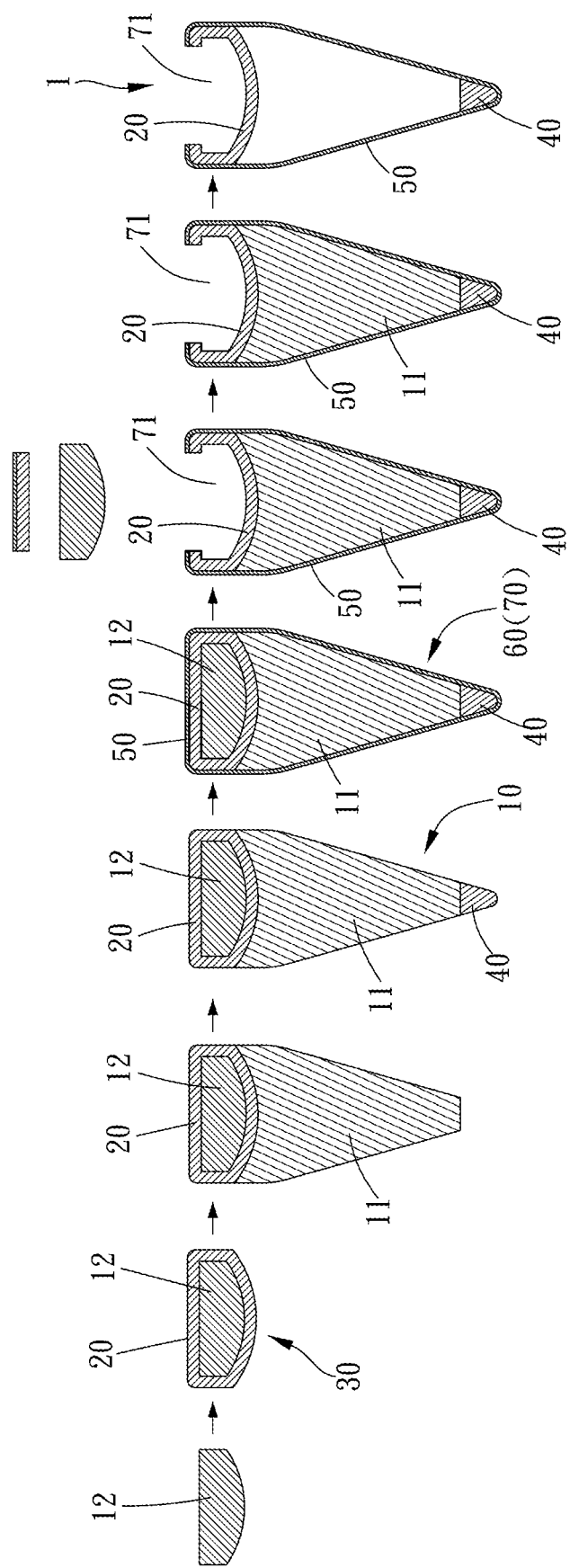
FIG. 9 is a flow diagram of a preferable embodiment of the present invention.

Please refer to FIGS. 1 to 9 for a preferable embodiment of the present invention. A method of manufacturing a carbon fiber wheel rim of the present invention includes following steps.

A core ring 10 is prepared. The core ring 10 includes a core material 11 which is disintegrable and annular. "Disintegrable" may be physical or chemical. In this embodiment, the step of preparing the core ring 10 includes following steps of: preparing a molding ring 12; coveringly applying at least one carbon fiber material on the molding ring 12, for example, continuously obliquely winding at least one second dry carbon yarn 20 around the molding ring 12, to form an upper semifinished rim 30; arranging the core material 11 annularly on an inner side of the upper semifinished rim 30; arranging a reinforcement member 40 on an inner side of the core material 11. The core material 11 is selected from one of polymer material (foamable), plastic, ceramic, salt, metal, wax or other materials which is removable. The molding ring 12 and the reinforcement member 40 may be made of heat resistant and hard material (such as carbon fiber composite) so as to improve structural strength of the carbon fiber rim. However, the reinforcement member 40 may be omitted. The carbon fiber material includes at least one second dry carbon yarn 20 which includes a plurality of carbon fibers. The at least one second dry carbon yarn 20 is wound around the molding ring 12 into several layers. Winding angles of the second dry carbon yarn 20 of every neighboring two of the layers are different so as to improve tensile strength of the carbon fiber rim 1 for preferable durability. However, it is also feasible to paste at least one pre-immersed carbon fiber sheet on the molding ring to form the upper semifinished rim.

At least one first dry carbon yarn 50 is continuously obliquely wound around the core ring 10, to form a first semifinished rim 60. The first dry carbon yarn 50 includes the plurality of carbon fibers. The at least one first dry carbon yarn 50 is wound around the core ring 10 into several layers, and winding angles of the at least one first dry carbon yarn 50 of every neighboring two of the layers are different so as to provide high tensile strength of the carbon fiber rim 1 for preferable durability.

The first semifinished rim 60 is placed in a mold, and vacuuming, resin injection and thermoforming (curing) are carried out, to form a second semifinished rim 70. The vacuuming allows the resin to fully infiltrate into apertures between the at least one first and second dry carbon yarn 50, 20 so as to improve integrity and toughness of the carbon fiber rim 1. At this step, it is unnecessary to provide an internal pressure or force to push the first semifinished rim 60 toward an inner surface of the mold and there is only low heat deformation of the core material 11, thus increasing production yield.

The second semifinished rim 70 is removed out of the mold and the core material 11 is disintegrated and removed. Any of the polymer material, plastic, ceramics and salt is disintegrated and removed by liquid. Any of the plastic and the ceramic is made of powder by compression molding. The liquid may be water or any solvent which can, physically or chemically, separate, decompose or melt the core material 11. Any of the metal and the wax is heated to melt and removed. When the core material 11 is selected from one of the metal and the wax, a temperature of the thermoforming is lower than a melting point of the core material 11. According to a period of the thermoforming, the resin may have a different melting point after being cured. Generally, the longer the curing period is, the higher the melting point of the resin is. For instance, the melting point of the resin which is cured can reach 230° C. by heating at 180° C. (a glass transition temperature (Tg) of the resin) for 30 to 45 minutes. A melting point of a selected one of the metal and the wax is lower than a melting point of the resin applied in the resin injection which is cured and higher than the Tg of the resin. For example, the melting point of the core material 11 is 200° C. and the Tg of the resin is 180° C., and the melting point of the resin which is cured is 230° C. so that the core material 11 is removable by heating to melt at a temperature between 200° C. and 230° C.

Finally, a part of the second semifinished rim 70 is removed to form an annular tire groove 71 for tire assembly. The step of forming the annular tire groove 71 may also be performed after removing the core material 11. It is also feasible to continuously obliquely wind the at least one first dry carbon yarn around the core material without the upper semifinished rim and an annular groove is directly formed on the second semifinished rim. The annular groove is configured to be assembled with a tubular tire.

In summary, the dry carbon yarn is wound continuously so that the structure is tight and uniform and has preferable structural integrity. The vacuuming, resin injection and thermoforming can decrease bubbles and improve production yield and structural strength. It is unnecessary to use a bladder during molding, which reduces the steps of inflation, deflation and removing from the mold and results in a simple and rapid manufacturing process.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method of manufacturing a carbon fiber wheel rim, including following steps of:

preparing a core ring, being annularly solid and including a core material which is disintegrable and annular;

continuously obliquely winding at least one first dry carbon yarn in contact with and around the core ring, to form a first semifinished rim;

placing the first semifinished rim in a mold, and performing vacuuming, resin injection and thermoforming, to form a second semifinished rim;

removing the second semifinished rim out of the mold, and disintegrating and removing the core material.

2. The method of claim 1, wherein the step of preparing the core ring includes following steps of:

preparing a molding ring;

coveringly applying at least one carbon fiber material on the molding ring, to form an upper semifinished rim;

arranging the core material annularly on an inner side of the upper semifinished rim.

3. The method of claim 2, further including a step of arranging a reinforcement member annularly on an inner side of the core material.

4. The method of claim 2, wherein the carbon fiber material includes at least one second dry carbon yarn which includes a plurality of carbon fibers, the at least one second dry carbon yarn is continuously obliquely wound around the molding ring into several layers, and winding angles of the at least one second dry carbon yarn of every neighboring two of the layers are different.

5. The method of claim 1, wherein the core material is selected from one of polymer material, plastic, ceramic, salt, metal and wax.

6. The method of claim 5, wherein any of the polymer material, plastic, ceramics and salt is disintegrated and removed by liquid.

7. The method of claim 5, wherein the core ring is made of material including plastic or ceramic via compression molding.

8. The method of claim 5, wherein any of the metal and the wax is heated to melt and removed.

9. The method of claim 8, wherein a melting point of a selected one of the metal and the wax is lower than a melting point of resin applied in the resin injection which is cured and higher than a glass transition temperature (Tg) of the resin.

10. The method of claim 1, wherein the first dry carbon yarn includes a plurality of carbon fibers, the at least one first dry carbon yarn is wound around the core ring into several layers, and winding angles of the at least one first dry carbon yarn of every neighboring two of the layers are different.

* * * * *